US 9,292,893 B2

(12) United States Patent
Leung et al.

(10) Patent No.: US 9,292,893 B2
(45) Date of Patent: Mar. 22, 2016

(54) CHAOTIC WATERMARKING FOR A DIGITAL IMAGE

(75) Inventors: Henry Leung, Calgary (CA); Siyue Chen, Calgary (CA)

(73) Assignee: Empire Technology Development LLC, Wilmington, DE (US)

( * ) Notice: Subject to any disclaimer, the term of this patent is extended or adjusted under 35 U.S.C. 154(b) by 1446 days.

(21) Appl. No.: 12/635,147

(22) Filed: Dec. 10, 2009

(65) Prior Publication Data
US 2011/0142302 A1  Jun. 16, 2011

(51) Int. Cl.
*G06T 1/00* (2006.01)

(52) U.S. Cl.
CPC .................................. *G06T 1/0021* (2013.01)

(58) Field of Classification Search
USPC .......................................................... 382/276
See application file for complete search history.

(56) References Cited

U.S. PATENT DOCUMENTS

| 6,535,616 | B1 * | 3/2003 | Hayashi et al. | 382/100 |
|---|---|---|---|---|
| 6,999,445 | B1 * | 2/2006 | Dmitriev et al. | 370/342 |
| 2002/0049614 | A1 * | 4/2002 | Rice et al. | 705/3 |
| 2004/0001164 | A1 * | 1/2004 | Murakami | 348/607 |
| 2005/0002543 | A1 * | 1/2005 | Cornog et al. | 382/100 |
| 2008/0219495 | A1 * | 9/2008 | Hulten et al. | 382/100 |
| 2008/0288566 | A1 * | 11/2008 | Umeno et al. | 708/250 |

OTHER PUBLICATIONS

Siyue Chen and Henry Leung, Chaotic Watermarking for Video Authentication in Surveillance Applications, IEEE Transactions on Circuits and Systems for Video Technology, 2008, pp. 704-709, vol. 18, No. 5.
J. Fridrich, M. Goljan and A.C. Baldoza, New fragile authentication watermark for images, Proceedings from ICIP, Sep. 2000, pp. 446-449, vol. I, Vancouver, B.C., Canada.
D.C. Lou and J.L. Liu, Fault resilient and compression tolerant digital signature for image authentication, IEEE Transactions on Consumer Electronics, 2000, pp. 31-39, vol. 46, No. 1.
Wikipedia, Discrete cosine transform, accessed online on Apr. 25, 2012 via http://en.wikipedia.org/wiki/Discrete_cosine_transform, last modified on Apr. 25, 2012.
Wikipedia, H.264/MPEG-4 AVC, accessed online on Apr. 25, 2012 via http://en.wikipedia.org/wiki/H.264/MPEG-4_AVC, last modified on Apr. 8, 2012.
Wikipedia, Steganography, accessed online on Apr. 25, 2012 via http://en.wikipedia.org/wiki/Steganography, last modified on Apr. 24, 2012.

\* cited by examiner

*Primary Examiner* — Tsan-Yu J Huang
(74) *Attorney, Agent, or Firm* — The Juhasz Law Firm PC

(57) ABSTRACT

Examples of encoding and decoding a watermark for a digital image and to using the watermark for authenticating the digital image are disclosed. The examples may include embedding a chaotic watermark in a digital image and using parameters associated with source and capture information for the digital image to both generate the chaotic watermark and to authenticate the digital image.

21 Claims, 8 Drawing Sheets

900 A computer program product.

902 A signal bearing medium.

904 instructions for encoding medical digital images with watermarks, which, when executed by logic, cause the logic to:

receive a medical digital image;

generate a first chaotic parameter associated with source information for the medical digital image and generate a second chaotic parameter associated with capture information for the medical digital image;

generate a chaotic sequence based on both the first chaotic parameter and the second chaotic parameter, wherein the chaotic sequence has a given initial condition and represents a watermark;

transform the medical digital image to include a plurality of image blocks via a discrete cosine transform (DCT) process; or embed the watermark in a first and a second image block from among the plurality of image blocks that form at least a part of the medical digital image.

| 906 a computer-readable medium. | 908 a recordable medium. | 910 a communications medium. |

FIG. 9

CHAOTIC WATERMARKING FOR A DIGITAL IMAGE

BACKGROUND

Unless otherwise indicated herein, the approaches described in this section are not prior art to the claims in this application and are not admitted to be prior art by inclusion in this section.

An image that has been captured or generated through the use of various capturing devices (e.g., video/picture cameras, health monitoring/evaluation devices, environmental monitoring devices, etc.) may be digitized to create a digital image. A type of image that may be digitized is a medical image. A medical image may refer to a technique or process to generate or create an image of at least a portion of patient's body for clinical purposes. In some examples, medical images may include, but are not limited to, radiographic (x-rays), magnetic resonance imaging (MRI), molecular imaging, thermography, tomography and ultrasound medical images. These types of medical images may be digitized to facilitate the sharing of patient information between medical professionals. Maintaining a patient's privacy and also maintaining the accuracy and/or integrity of medical images may be important considerations associated with digitizing medical images. Also, other types of digital images, other than digitized medical images, may place a similar amount of importance on maintaining accuracy and/or integrity of a digital image.

BRIEF DESCRIPTION OF THE DRAWINGS

FIG. 9 shows a block diagram of an example computer program product, arranged in accordance with the present disclosure.

DETAILED DESCRIPTION

Figure 1:
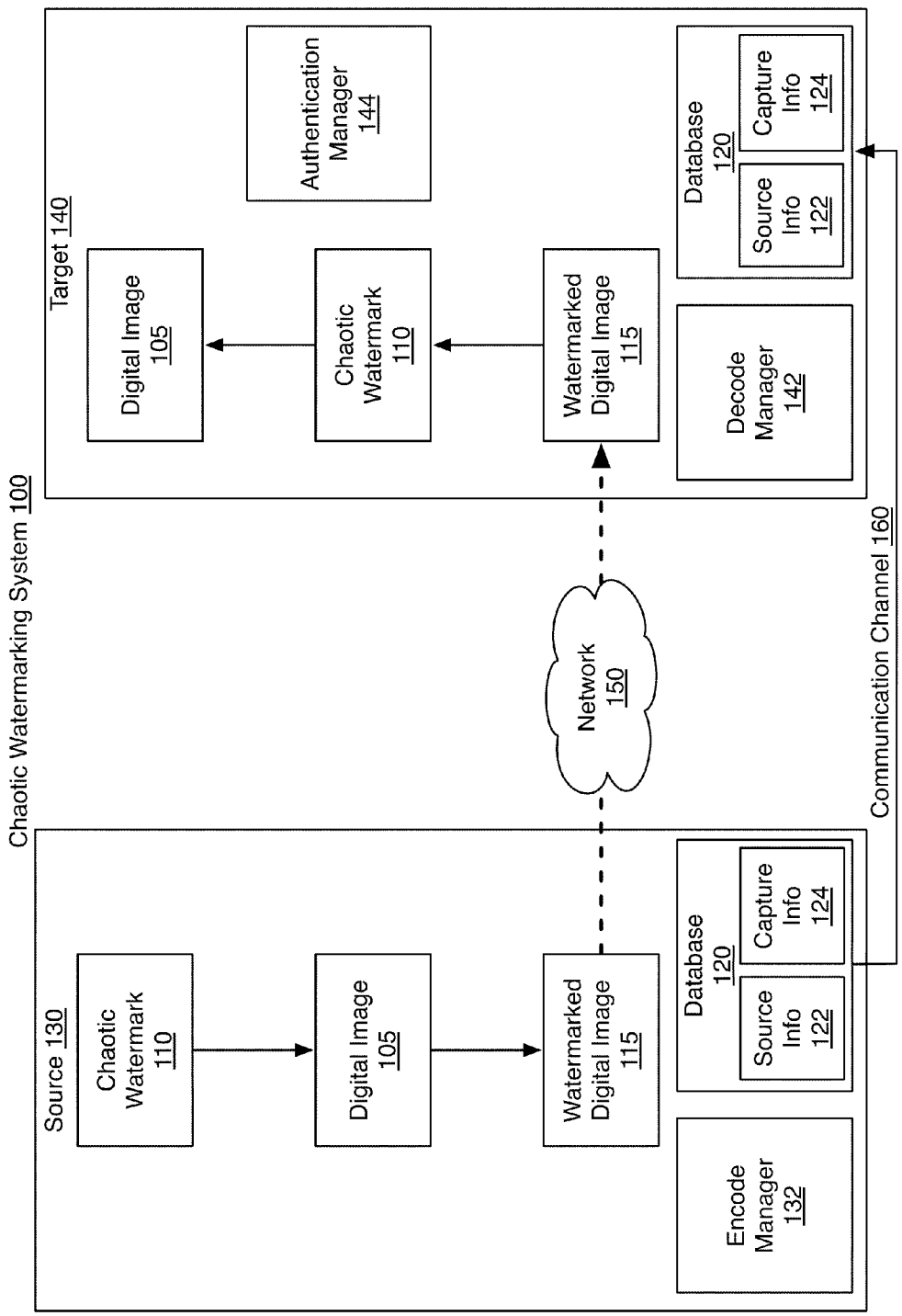
FIG. 1 shows an illustrative embodiment of a chaotic watermarking system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to encoding and decoding a watermark for a medical digital image and to using information associated with a decoded watermark for authenticating the medical digital image.

The present disclosure contemplates that maintaining accuracy and/or integrity of an image may be an important consideration associated with an image that may be digitized such as a medical image. In some examples, the embedding of a watermark in a digital image may be a way to maintain privacy and also accuracy and/or integrity of a medical image that may be used or employed in such medical applications as telemedicine, although the present disclosure is not limited to digitized medical images and may include watermarking for all types of digital images.

In some example methods of the present disclosure, a watermark may be encoded in a received digital image (e.g., a medical image). These example methods may include the generation of a first chaotic parameter associated with source information for the digital image and the generation of a second chaotic parameter associated with capture information for the digital image. A first chaotic sequence and a second chaotic sequence may then be generated based on both the first chaotic parameter and the second chaotic parameter. The first chaotic sequence may have a given initial condition and may represent a first watermark. The digital image may then be transformed to include a plurality of image blocks via a discrete cosine transform (DCT) process. The first watermark may then be embedded in a first and a second image block from among the plurality of image blocks that form at least a part of the medical digital image.

FIG. 1 shows an illustrative embodiment of a chaotic watermarking system 100. As shown in FIG. 1, chaotic watermarking system 100 includes a source 130, a target 140, a network 150 and a communication channel 160. In some examples, source 130 may include an encode manager 132 and target 140 may include a decode manager 142 and an authentication manager 144. Also, source 130 and target 140 may separately include a database 120 that includes source information 122 and capture information 124.

In some examples, as described more below, a chaotic watermark 110 may be embedded (e.g., by encode manager 132) in a received digital image 105 that may result in a watermarked digital image 115. Watermarked digital image 115 may be then be forwarded from source 130 (e.g., a first hospital) via a wired or wireless network 150 (e.g. a wide area network (WAN/WWAN) or local area network (LAN/WLAN)) to a target 140 (e.g., a second hospital). Watermarked digital image 115 may be received at target 140. Chaotic watermark 110 may then be extracted (e.g., by decode manager 142) from watermarked digital image 115 at target 140 and result in the original digital image 105.

In some examples, as described more below, an extracted chaotic watermark 110 may be compared to the information included in database 120 (e.g., source information 122 and capture information 124) to identify the source and the point of capture (e.g., a patient) for digital image 105. Also, in some examples, as described more below, digital image 105 may be authenticated (e.g., by authentication manager 144) to verify or determine the accuracy and/or integrity of digital image 105 based on a comparison of an extracted chaotic watermark 110 to a reconstructed chaotic watermark. In some examples, the reconstructed watermark may be reconstructed from parameters extracted from extracted chaotic watermark 110.

In some examples, source information 122 of database 120 may include information to identify the source of the digital image. For example, if the digital image is a medical digital image, source information 122 may include a physical location of the source (e.g., a hospital's address), person(s) that captured/generated the medical digital image, date the medical digital image was captured/generated, a doctor for the patient or any other information related to the source of the medical digital image.

In some examples, capture information 124 of database 120 may include information to identify the point of capture of the digital image. For example, if the digital image is a medical image, capture information 124 may include a patient's name, patient's address, a patient's data of birth, a patient's tax identification number, a patient's medical identification, a date the medical digital image was captured/generated, or any other information related to the patient for the medical digital image.

As shown in FIG. 1, database 120 may be located at or resides with source 130 and/or target 140. In some examples, all or at least a portion of database 120 may be located remotely to source 130 and/or target 140. For remotely located examples, at least a portion of database 120 may be accessible to elements resident at source 130 and target 140 via network 150. In other examples, communication channel 160 may be used to provide source and capture information from source 130 to target 140. In these other examples, communication channel 160 may be a secured communication channel used to forward the source and capture information from a database 120 maintained/resident at source 130 to target 140. Thus, communication channel 160 may be a separate communication channel from a communication channel used to transmit watermarked digital image 115 to target 140 via network 150.

Figure 2:
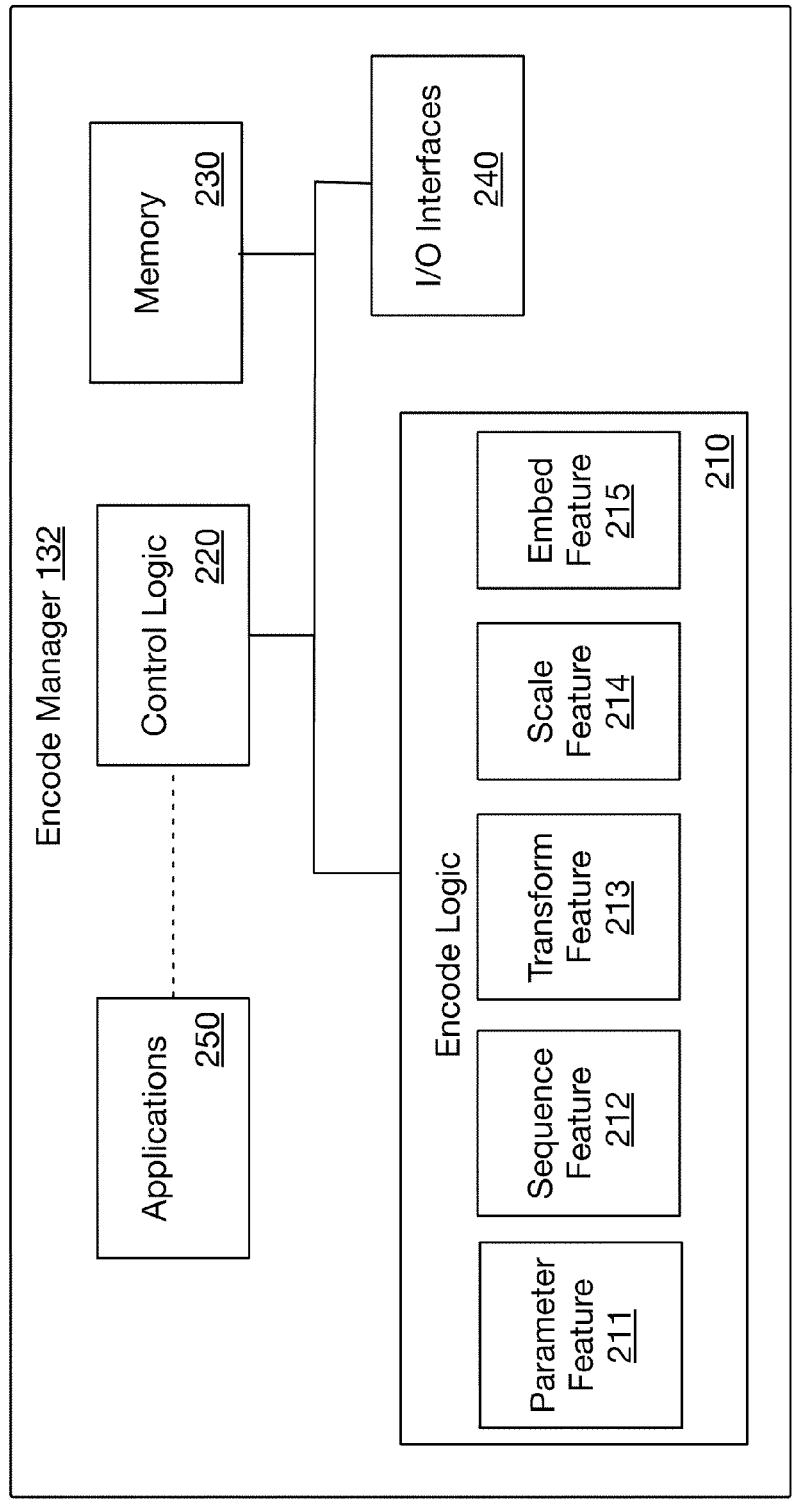
FIG. 2 shows an illustrative embodiment of an encoding manager.

FIG. 2 shows an illustrative embodiment of encode manager 132. As mentioned above for FIG. 1, source 130 may include encode manager 132. In some examples, encode manager 132 may include features and/or logic configured or arranged to encode a watermark (e.g., chaotic watermark 110) in a digital image (e.g., digital image 105).

The example encode manager 132 of FIG. 2 includes encode logic 210, control logic 220, a memory 230, input/output (I/O) interfaces 240 and optionally one or more applications 250. As illustrated in FIG. 2, encode logic 210 may be coupled to control logic 220, memory 230 and/or I/O interfaces 240. Also illustrated in FIG. 2, optional applications 250 may be arranged in cooperation with control logic 220. Encode logic 210 may further include one or more of a parameter feature 211, a sequence feature 212, a transform feature 213, a scale feature 214 or an embed feature 215.

In some examples, the elements portrayed in FIG. 2's block diagram may be configured to support or enable encode manager 132 as described in this disclosure. A given encode manager 132 may include some, all or more elements than those depicted in FIG. 2. For example, encode logic 210 and control logic 220 may separately or collectively represent a wide variety of logic device(s) to implement the features of encode manager 132. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as mentioned above, encode logic 210 may include one or more of parameter feature 211, sequence feature 212, transform feature 213, scale feature 214 or embed feature 215. Encode logic 210 may be configured to use one or more of these features to perform operations. As described in more detail below, example operations may include one or more of encoding a watermark in a digital image.

In some examples, control logic 220 may be configured to control the overall operation of encode manager 132. As mentioned above, control logic 220 may represent any of a wide variety of logic device(s) configured to operate in conjunction with executable content to implement the control of encode manager 132. In some alternate examples, the features and functionality of control logic 220 may be implemented within encode logic 210.

According to some examples, memory 230 may be arranged to store executable content. The executable content may be used by control logic 220 and/or encode logic 210 to implement or activate features or elements of encode manager 132. Memory 230 may also be arranged to temporarily maintain information such as capture and source information for a digital image (e.g., digital image 105) that is to be watermarked (e.g., by chaotic watermark 110). Memory 230 may also be arranged to temporarily maintain information associated with generating the watermark (e.g., a Hénon map).

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via one or more communication mediums or links between encode manager 132 and elements resident on source 130 (e.g., image capturing, generating or storage devices) or remotely located to source 130 (e.g., target 140). I/O interfaces 240, for example, may include an interface configured to operate according to various communication protocols to allow encode manager 132 to communicate over the plurality of communication links (e.g., Ethernet, ATM, IPv4, IPv6, OC-192, etc.).

In some examples, encode manager 132 may include one or more applications 250 to provide instructions to control logic 220 and/or encode logic 210.

Figure 3:
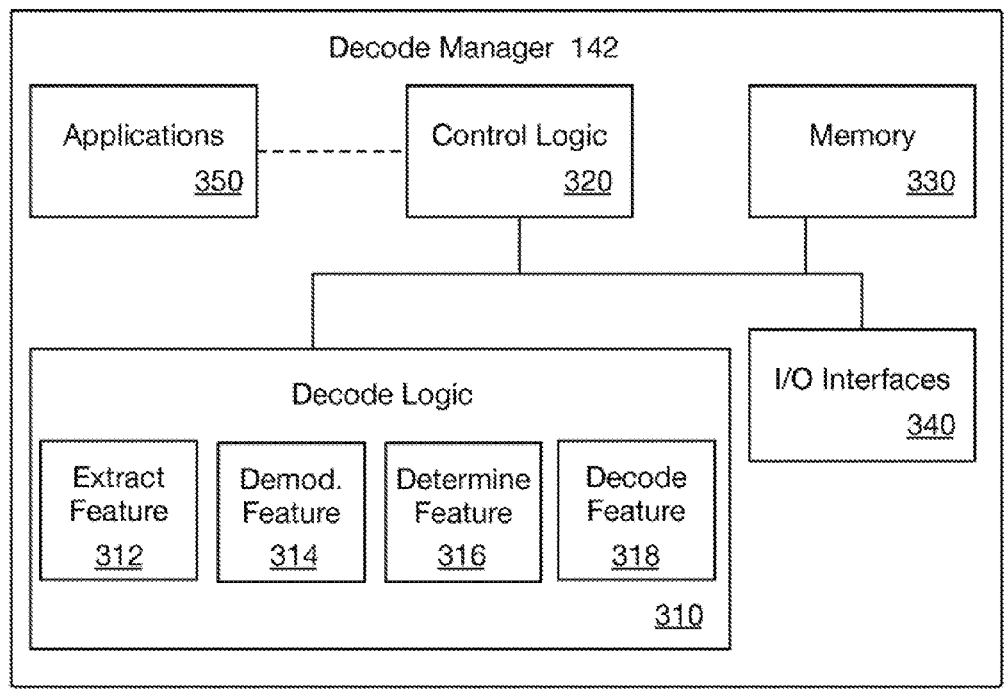
FIG. 3 shows an illustrative embodiment of a decode manager.

FIG. 3 shows an illustrative embodiment of decode manager 142. As mentioned above for FIG. 1, target 140 may include decode manager 142. In some examples, decode manager 142 may include features and/or logic configured or arranged to decode a watermark (e.g., chaotic watermark 110) included in digital image 105 (e.g., a medical image).

The example decode manager 142 of FIG. 3 includes decode logic 310, control logic 320, a memory 330, input/output (I/O) interfaces 340 and optionally one or more applications 350. As illustrated in FIG. 3, decode logic 310 may be coupled to control logic 320, memory 330 and/or I/O interfaces 340. Also illustrated in FIG. 3, the optional applications 350 may be arranged in cooperation with control logic 320. Decode logic 310 may further include one or more of an extract feature 312, a demodulation feature 314, a determine feature 316 or a decode feature 318.

In some examples, the elements portrayed in FIG. 3's block diagram may be configured to support or enable decode manager 142 as described in this disclosure. A given decode manager 142 may include some, all or more elements than those depicted in FIG. 3. For example, decode logic 310 and control logic 320 may separately or collectively represent a wide variety of logic device(s) to implement the features of decode manager 142. An example logic device may include one or more of a computer, a microprocessor, a microcontroller, an FPGA, an ASIC, a sequestered thread or a core of a multi-core/multi-threaded microprocessor or a combination thereof.

In some examples, as mentioned above, decode logic 310 may include one or more of extract feature 312, demodulation feature 314, determine feature 316 or decode feature 318. Decode logic 310 may be configured to use one or more of these features to perform operations. As described in more detail below, example operations may include one or more of decoding a watermark included in a digital image.

In some examples, control logic 320 may be configured to control the overall operation of decode manager 142. As mentioned above, control logic 320 may represent any of a wide variety of logic device(s) configured to operate in conjunction with executable content to implement the control of decode manager 142. In some alternate examples, the features and functionality of control logic 320 may be implemented within decode logic 310.

According to some examples, memory 330 may be arranged to store executable content. The executable content may be used by control logic 320 and/or decode logic 310 to implement or activate features or elements of decode manager 142. Memory 330 may also be arranged to temporarily maintain information such as capture and source information obtained from a database. Memory 330 may also be arranged to temporarily maintain information associated with extracting a watermark (e.g., a Hénon map and associated given initial conditions for chaotic sequences).

Memory 330 may include a wide variety of memory media including, but not limited to, one or more of volatile memory, non-volatile memory, flash memory, programmable variables or states, RAM, ROM, or other static or dynamic storage media.

In some examples, I/O interfaces 340 may provide an interface via one or more communication mediums or links between decode manager 142 and elements resident on target 140 (e.g., authentication manager 144) or remotely located to target 140 (e.g., source 130). I/O interfaces 340, for example, may include an interface configured to operate according to various communication protocols to allow decode manager 142 to communicate over the plurality of communication links (e.g., PCI EXPRESS, USB, Ethernet, ATM, IPv4, IPv6, OC-192, etc.).

In some examples, decode manager 142 may include one or more applications 350 to provide instructions to control logic 320 and/or decode logic 310.

Figure 4:
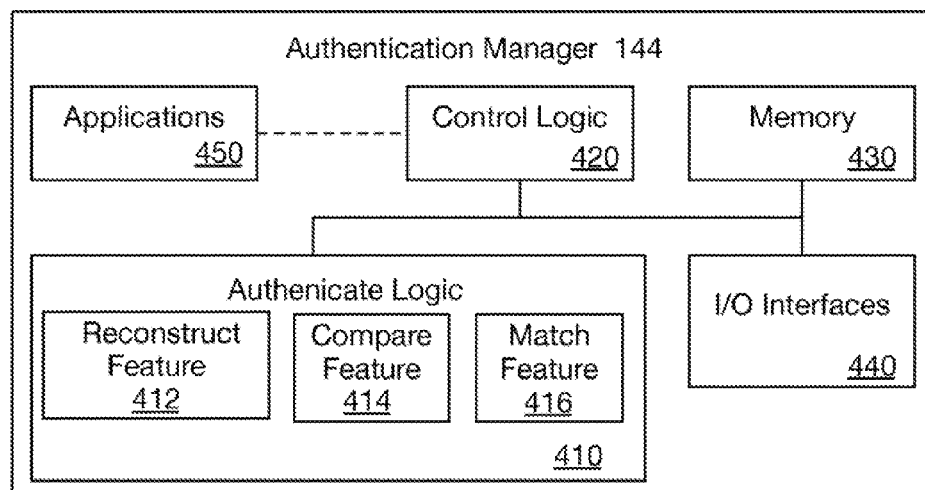
FIG. 4 shows an illustrative embodiment of an authentication manager.

FIG. 4 shows an illustrative embodiment of authentication manager 144. As mentioned above for FIG. 1, target 140 may include authentication manager 144. In some examples, authentication manager 144 may include features and/or logic configured or arranged to authenticate a digital image (e.g., digital image 105) that includes a watermark (e.g., chaotic watermark 110).

The example authentication manager 144 of FIG. 4 includes authenticate logic 410, control logic 420, a memory 430, input/output (I/O) interfaces 440 and optionally one or more applications 450. As illustrated in FIG. 4, authenticate logic 410 may be coupled to control logic 420, memory 430 and/or I/O interfaces 440. Also illustrated in FIG. 4, the optional applications 450 may be arranged in cooperation with control logic 420. Authenticate logic 410 may further include one or more of a reconstruct feature 412, a compare feature 414 or a match feature 416.

In some examples, the elements portrayed in FIG. 4's block diagram may be configured to support or enable authentication manager 144 as described in this disclosure. A given authentication manager 144 may include some, all or more elements than those depicted in FIG. 4. For example, authenticate logic 410 and control logic 420 may separately or collectively represent a wide variety of logic device(s) to implement the features of authentication manager 144. An example logic device may include one or more of a computer, a microprocessor, a microcontroller, an FPGA, an ASIC, a sequestered thread or a core of a multi-core/multi-threaded microprocessor or a combination thereof.

In some examples, as mentioned above, authenticate logic 410 may include one or more of reconstruct feature 412, compare feature 414 or match feature 416. Authenticate logic 410 may be configured to use one or more of these features to perform operations. As described in more detail below, example operations may include one or more of authenticating a digital image that includes a watermark.

In some examples, control logic 420 may be configured to control the overall operation of authentication manager 144. As mentioned above, control logic 420 may represent any of a wide variety of logic device(s) configured to operate in conjunction with executable content to implement the control of authentication manager 144. In some alternate examples, the features and functionality of control logic 420 may be implemented within authenticate logic 410.

According to some examples, memory 430 may be arranged to store executable content. The executable content may be used by control logic 420 and/or authenticate logic 410 to implement or activate features or elements of authentication manager 144. Memory 430 may also be arranged to temporarily maintain information such as chaotic sequences and chaotic parameters associated with capture and source information. Memory 430 may also be arranged to temporarily maintain information associated with reconstructing a watermark (e.g., a Hénon map and associated given initial conditions for chaotic sequences).

Memory 430 may include a wide variety of memory media including, but not limited to, one or more of volatile memory, non-volatile memory, flash memory, programmable variables or states, RAM, ROM, or other static or dynamic storage media.

In some examples, I/O interfaces 440 may provide an interface via one or more communication mediums or links between authentication manager 144 and elements resident on target 140 (e.g., decode manager 142) or remotely located to target 140 (e.g., source 130). I/O interfaces 440, for example, may include an interface configured to operate according to various communication protocols to allow authentication manager 144 to communicate over one or more communication links (e.g., PCI EXPRESS, USB, Ethernet, ATM, IPv4, IPv6, OC-192, etc.).

In some examples, authentication manager 144 may include one or more applications 450 to provide instructions to control logic 420 and/or authenticate logic 410.

Figure 5:
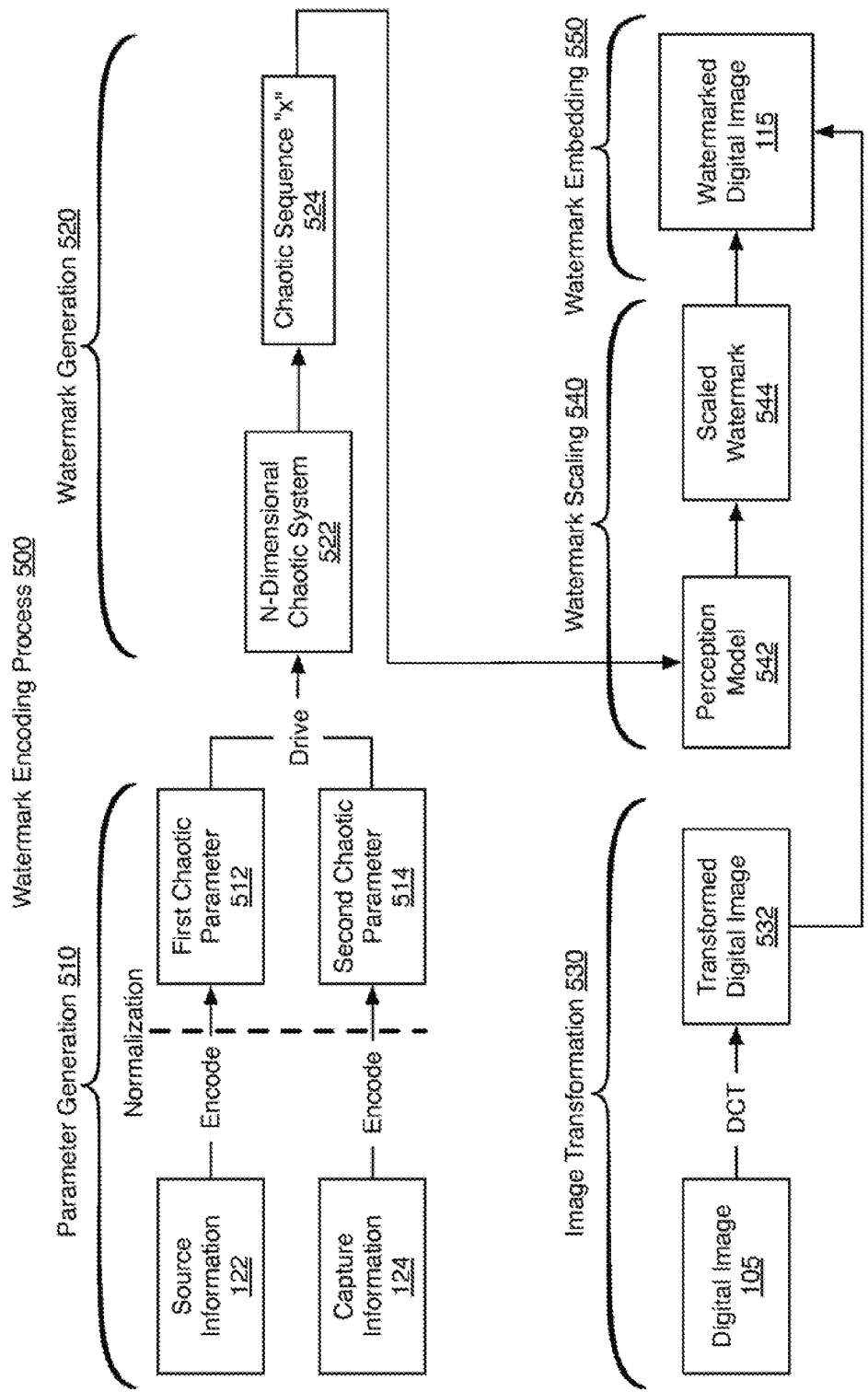
FIG. 5 illustrates an example process diagram for a watermark encoding process.

FIG. 5 illustrates an example process diagram for a watermark encoding process 500 in accordance with the present disclosure. In some examples, the process diagram is implemented using the example chaotic watermarking system 100 depicted in FIG. 1 and source 130 including encoding manager 132 having logic as shown in FIG. 2. But the described example processes are not limited to an implementation on chaotic watermarking system 100 as shown in FIG. 1 or to encoding manager 132 shown in FIG. 2. The example processes may be implemented on other chaotic watermarking systems that may include managers having logic configured to include one or more of the elements depicted in FIGS. 1 and 2.

Starting at an example process 510 (Parameter Generation), encode manager 132 may include logic and/or features configured to obtain source information 122 and capture information 124 for a received digital image 105 and generate a first chaotic parameter 512 and a second chaotic parameter 514 (e.g., via parameter feature 211). Source information 122 and capture information 124 may be represented by a number such as "123" or "456", respectively. In some examples, a chaotic regime for generating a chaotic watermark may be (0,1) and corresponding chaotic parameters may be obtained by normalizing source information 122 and capture information 124 by a large number (e.g., 1,000). In these examples, using a chaotic regime of (0,1) and a normalization by a large number such as 1,000, source information 122 may be encoded to generate first chaotic parameter 512 as "0.123" and capture information 124 may be encoded to generate second chaotic parameter 514 as "0.456."

Moving to an example process 520 (Watermark Generation), encode manager 132 may include logic and/or features configured to drive an N-dimensional chaotic system 522 to generate a chaotic sequence 524 (e.g., via sequence feature 212). In some examples, N-dimensional chaotic system 522 is driven to generate chaotic sequence 524 based on first chaotic parameter 512 and second chaotic parameter 514. Also, in some examples, a Hénon map may be used to generate two chaotic sequences by implementing example equation (1) and/or example equation (2).

$$y(k+1)=x(k) \qquad (1)$$

$$x(k+1)=1-ax^2(k)+by(k) \qquad (2)$$

For example equations (1) and (2), an example given initial condition $x(0)=y(0)=0.769$ and chaotic parameters "a" and "b" may represent first chaotic parameter 512 and second chaotic parameter 514, respectively. In some aspects of the present disclosure, a first chaotic sequence $x(k)$ generated from example equations (1) and/or (2) may be used as chaotic sequence 524. Chaotic sequence 524, as further described below, may further be included in or may represent a watermark to be embedded in digital image 105. Although not shown in FIG. 5, another sequence $y(k)$ generated from example equations (1) and/or (2) may be used as or may represent another watermark that may also be embedded in digital image 105.

Continuing to an example process 530 (Image Transformation), encode manager 132 may include logic and/or features configured to transform digital image 105 to create a transformed digital image 532 (e.g., via transform feature 213). In some examples, transformed digital image 532 may be transformed via a discrete cosine transform (DCT) process to include multiple image blocks that may separately contain 8×8 pixels.

Moving to an example process 540 (Watermark Scaling), encode manager 132 may include logic and/or features configured to scale a watermark to be embedded in transformed digital image 532 (e.g., via transform feature 213). In some examples, a perception model 542 may be used to calculate or determine a scalar for chaotic sequence 524 that is to be embedded in transformed digital image 532. The scalar may be implemented in a way to scale chaotic sequence 524 to generate a scaled watermark 544 that may be sufficiently imperceptible to observer(s) of transformed digital image 532 including embedded scaled watermark 544. For example, an unaided eye may be unable to recognize that scaled watermark 544 is embedded in transformed digital image 532. In other words, scaled watermark 544 may be imperceptible to the physical limitations of the human eye.

In some examples, perception model 542 may be implemented as described in industry standards for image compression such as that developed by the Telecommunication Standardization Sector of the International Telecommunication Union (ITU-T), Video Coding Experts Group (VCEG), ITU-T H.264, published May 2003, and/or later versions of the standard ("H.264"). Perception model 542 may also be implemented as described in another industry standard for image compression such as the standard developed by the International Organization of Standards (ISO)/International Electrotechnical Commission (IEC), Moving Picture Experts Group (MPEG), ISO/IEC 14496, published May 2003, and/or later versions of the standard ("MPEG-4 AVC").

Continuing to an example process 550 (Watermark Embedding), encode manager 132 may include logic and/or features configured to embed a watermark in transformed digital image 532 (e.g., via embed feature 215). In some examples, to embed scaled watermark 544, two image blocks may be selected from among the multiple image blocks of transformed digital image 532. The selection of the two image blocks may be based on a certain security key. A difference between sums of mid-frequency DCT coefficients for the two selected image blocks may be made equal to scaled watermark 544 in order to embed scaled watermark 544 in the two selected image blocks.

In some examples, watermarked digital image 115 is packaged and forwarded to a target (e.g., target 140) via a communication medium (e.g., network 150). The entire digital image 105 may be watermarked as described above to create watermarked digital image 115. In alternative examples, a subset of digital image 105 may be watermarked as described above to create watermarked digital image 115.

Figure 6:
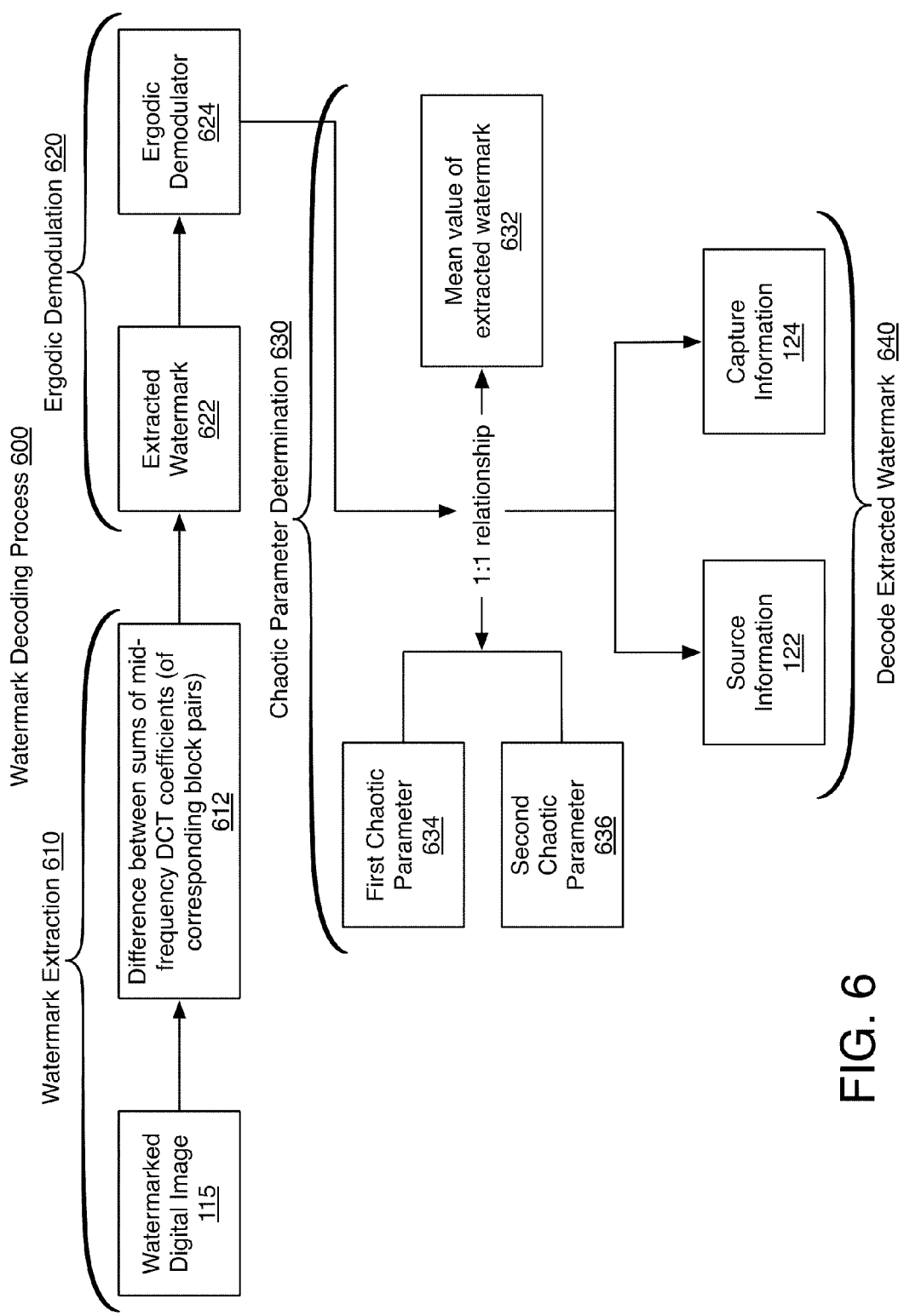
FIG. 6 illustrates an example process diagram for a watermark decoding process.

FIG. 6 illustrates an example process diagram for a watermark decoding process 600 in accordance with the present disclosure. In some examples, the process diagram is implemented using the example chaotic watermarking system 100 depicted in FIG. 1 and target 140 including decode manager 142 having logic as shown in FIG. 3. But, the described example processes are not limited to an implementation on chaotic watermarking system 100 as shown in FIG. 1 or to decode manager 142 shown in FIG. 3. The example processes may be implemented on other chaotic watermarking systems that may include managers having logic configured to include one or more of the elements depicted in FIGS. 1 and 3.

Starting at an example process 610 (Watermark Extraction), decode manager 142 may include logic and/or features configured to extract a watermark from a received watermarked digital image 115 (e.g., via extract feature 312). In some examples, watermark extraction is an inverse process of how the watermark was embedded as mentioned above at example process 550 for FIG. 5. For example, the difference between sums of mid-frequency DCT coefficients 612 for selected first and second image blocks of watermarked digital image 115 may be used to extract the watermark from watermarked digital image 115. In some examples, the selection of the first and second image blocks may be based on a certain security key.

Continuing to an example process 620 (Ergodic Demodulation), decode manager 142 may include logic and/or features configured to implement a chaotic sequence that may be included in an extracted watermark 622 in order to demodulate the chaotic sequence (e.g., via demodulation feature 314). In some examples, the chaotic sequence may be demodulated using an ergodic demodulator 624 and a mean value for the chaotic sequence included in extracted watermark 622 may be determined or calculated.

Moving to an example process 630 (Chaotic Parameter Determination), decode manager 142 may include logic and/or features configured to determine chaotic parameters related to the computed mean value for the chaotic sequence included in extracted watermark 622 (e.g., via determine feature 316). The computed mean value for the chaotic sequence included in extracted watermark 622 is shown in FIG. 6 as a mean value of extracted watermark 632. In some examples, a one-to-one relationship between mean value of extracted watermark 632 and a first chaotic parameter 634 and a second chaotic parameter 636 allows for a determination of these two chaotic parameters. For example, based on this one-to-one relationship, determine feature 316 may be configured to compare mean value of extracted watermark 632 to an index or database including pairs of chaotic parameters in order to determine first and second chaotic parameters 634 and 636.

Continuing to an example process 640 (Decode Extracted Watermark), decode manager 142 may include logic and/or features configured to decode extracted watermark 622 (e.g., via decode feature 318). In some examples, decoding extracted watermark 622 may include comparing first chaotic parameter 634 and second chaotic parameter 636 to source and capture information included in database 120 to decode extracted watermark 622. The decoded extracted watermark 622 may indicate that first and second chaotic parameters 634 and 636 may be associated with source information 122 and capture information 124, respectively. In some examples, as mentioned above, database 120 may be located at or reside with source 130 (e.g., obtained/accessible via communication channel 160), located at target 140 or may be located remotely and accessible to target 140 (e.g., via network 150).

Figure 7:
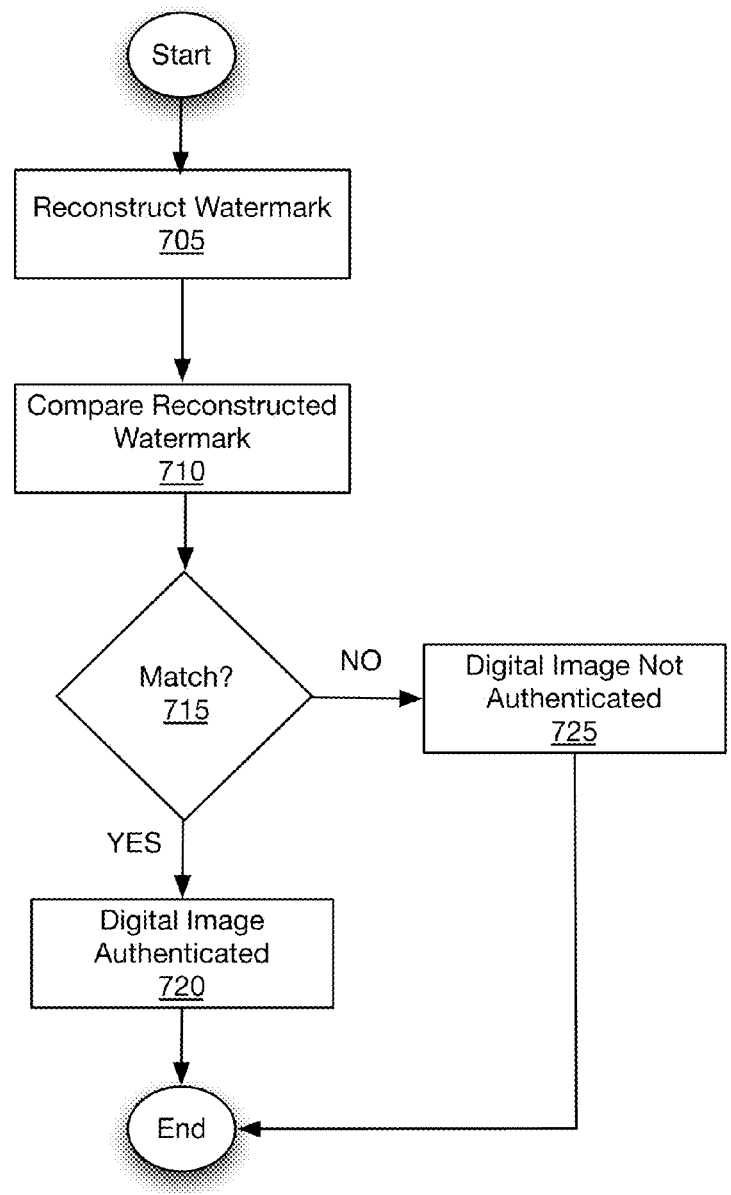
FIG. 7 is a flow chart of an illustrative embodiment of a method for authenticating a digital image.

FIG. 7 is a flow chart of an illustrative embodiment of a method for authenticating a digital image (e.g., digital image 105). In some examples, the example methods may be implemented using the example chaotic watermarking system 100 depicted in FIG. 1 and target 140 including authentication manager 144 having logic as shown in FIG. 4. But the described example methods are not limited to an implementation on chaotic watermarking system 100 as shown in FIG. 1 or to authentication manager 144 shown in FIG. 4. The example processes may be implemented on other chaotic watermarking systems that may include managers having logic configured to include one or more of the elements depicted in FIGS. 1 and 4.

Beginning in block 705 (Reconstruct Watermark), authentication manager 144 may include logic and/or features configured to reconstruct a watermark (e.g., via reconstruct feature 412). In some examples, first chaotic parameter 634 and second chaotic parameter 636 are used to reconstruct the watermark to include a reconstructed chaotic sequence. As mentioned above, the first chaotic parameter 634 and second chaotic parameter 636 were decoded based on source and capture information included in database 120. Also, as mentioned above, the decoded first and second chaotic parameters 634 and 636 may have indicated an association with source information 122 and capture information 124, respectively. The reconstructed chaotic sequence may be generated in a similar way to the way chaotic sequence 524 was generated as described above for the example processes depicted in FIG. 5. For example, a Hénon map may be used to generate the reconstructed chaotic sequence implementing example equations (1) and/or (2) and the reconstructed chaotic sequence may also have the given initial condition of $x(0)=y(0)=0.769$.

In block 710 (Compare Reconstructed Watermark to Extracted Watermark), authentication manager 144 may include logic and/or features configured to compare the reconstructed chaotic sequence included in the reconstructed watermark to an extracted chaotic sequence included in extracted watermark 622 (e.g., via compare feature 414).

In decision block 715 (Match?), authentication manager 144 may include logic and/or features configured to determine whether the reconstructed chaotic sequence included in the reconstructed watermark matches the extracted chaotic sequence included in extracted watermark 622 (e.g., via match feature 416). Processing may continue from decision block 715 to block 720 when a determination is made that a match has occurred. Otherwise, processing may continue from decision block 715 to block 725 when a determination is made that a match has not occurred.

In block 720 (Digital Image Authenticated), authentication manager 144 may determine that the digital image is authentic based on the reconstructed chaotic sequence included in the reconstructed watermark matching the extracted chaotic sequence included in extracted watermark 622 and the process may then come to an end. In some examples, an exact match of the chaotic sequences may be required to authenticate digital image 105. In some other examples, at least a substantial matching of the chaotic sequences may be required to authenticate digital image 105.

In block 725 (Digital Image Not Authenticated), authentication manager 144 determines that medical image 105 is not authenticated based on the reconstructed chaotic sequence included in the reconstructed watermark not matching the extracted chaotic sequence included in extracted watermark 622 and the process comes to an end. In some examples, reasons for the mismatch may be investigated to reveal where and how severe digital image 105 may have been manipulated or tampered.

Figure 8:
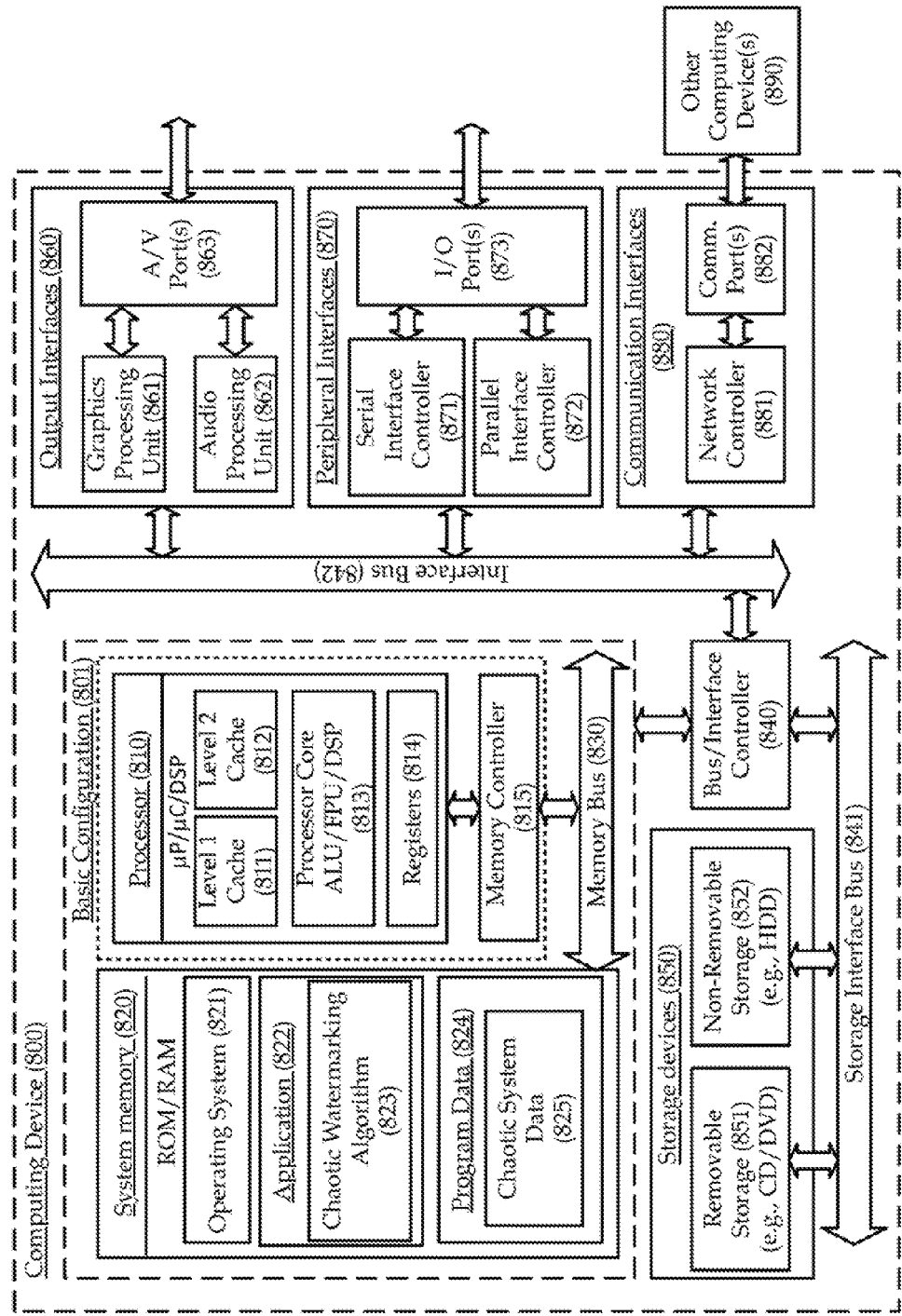
FIG. 8 illustrates an example computing device that may be arranged for encoding or decoding a chaotic watermark and/or authenticating a digital image.

FIG. 8 is a block diagram illustrating an example computing device 800 that may be arranged for encoding or decoding a watermark and/or authenticating a digital image in accordance with the present disclosure. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (µP), a microcontroller (µC), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes a chaotic watermarking algorithm 823 that is arranged to perform the functions as described herein including the actions described with respect to the process diagrams shown in FIGS. 5 and 6 and with respect to the flow chart shown in FIG. 7 or to the functions described for encode manager 132, decode manager 142 and authentication manager 144 shown in FIGS. 2, 3 and 4, respectively. Program data 824 includes chaotic system data 825 that may be useful for implementing chaotic watermarking algorithm 823. In some example embodiments, application 822 may be arranged to operate with program data 824 on an operating system 821 such that implementations of encoding and decoding a watermark for a digital image and to using the watermark for authenticating the digital image may be provided as described herein. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of computing device 800.

Computing device 800 can also include an interface bus 842 for facilitating communication from various interface devices (e.g., output interfaces, peripheral interfaces, and communication interfaces) to the basic configuration 801 via the bus/interface controller 840. Example output interfaces 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which can be arranged to facilitate communications with one or more other computing devices 890 over a network communication via one or more communication ports 882. In one example, computing devices 890 may include sources (e.g., source 130), targets (e.g., target 140) or database servers housing a remotely located database (e.g., database 120) coupled to network 150 as shown in FIG. 1. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations. Computing device 800 may also be implemented in one of these forms as a source and/or target coupled to a network as described in this disclosure.

FIG. 9 shows a block diagram of an example computer program product 900 arranged in accordance with the present disclosure. In one embodiment, as shown in FIG. 9, computer program product 900 includes a signal bearing medium 902 that may also include instructions 904. In some examples, instructions 904 for encoding medical digital images with watermarks, which when executed by a computer or logic, cause the computer or logic to generate a first chaotic parameter associated with source information for the medical digital image and generate a second chaotic parameter associated with capture information for the medical digital image. Instructions 904 may also cause the computer or logic to generate a first chaotic sequence and a second chaotic sequence based on both the first chaotic parameter and the second chaotic parameter. In some examples, the first chaotic sequence has a given initial condition and represents a watermark. Instructions 904 may further cause the computer or logic to transform the medical digital image to include multiple of image blocks via a discrete cosine transform (DCT) process and to embed the watermark in a first and a second image block from among the multiple image blocks that form at least a part of the medical digital image.

Also depicted in FIG. 9, some embodiments may include one or more of a computer readable medium 906, a recordable medium 908 or a communications medium 910. The dotted boxes around these elements depict different types of mediums included within, but not limited to, signal bearing medium 902. These types of mediums may distribute instruction 904 to be executed by a computer or logic. Computer readable medium 906 and recordable medium 908 may include, but are not limited to, a flexible disk, a hard disk drive (HDD), a Compact Disc (CD), a Digital Video Disk (DVD), a digital tape, a computer memory, etc. Communications medium 910 may include, but is not limited to, a digital and/or an analog communication medium (e.g., a fiber optic cable, a waveguide, a wired communication link, a wireless communication link, etc.).

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms may be interpreted broadly. For example, the phrase "coupled to" may refer to being communicatively, electrically and/or operatively coupled as appropriate for the context in which the phrase may be used.

Those skilled in the art will recognize that it is common within the art to describe devices and/or processes in the fashion set forth herein, and thereafter use engineering practices to integrate such described devices (e.g., managers, databases, computing device, etc.) and/or methods into data processing systems. That is, at least a portion of the devices and/or methods described herein may be integrated into a data processing system via a reasonable amount of experimentation. Those having skill in the art may recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It may be understood that such depicted architectures are merely examples, and that in fact many other architectures can be implemented which achieve the same functionality. In a conceptual sense, any arrangement of components to achieve the same functionality may effectively be "associated" such that the desired functionality may be achieved. Hence, any two components herein combined to achieve a particular functionality may be seen as "associated with" each other such that the desired functionality may be achieved, irrespective of architectures or intermedial components. Likewise, any two components so associated can also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as may be appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction may be intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense that one having skill in the art would understand the convention (e.g., "a system having at least one of A, B, or C" would include but not be limited to systems that have A alone, B alone, C alone, A and B together, A and C together, B and C together, and/or A, B, and C together, etc.). It may be further understood by those within the art that virtually any disjunctive word and/or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

What is claimed is:

1. A method for encoding medical digital images with watermarks comprising:
   receiving a medical digital image;
   generating a first chaotic parameter associated with source information for the medical digital image, wherein the first chaotic parameter is generated based at least in part on normalizing a single number representing the entire medical digital image;
   generating a chaotic sequence based on the first chaotic parameter, wherein the first chaotic parameter is used as an initial condition to generate the chaotic sequence and wherein the chaotic sequence represents a watermark;
   transforming the medical digital image to include a plurality of image blocks via a discrete cosine transform (DCT) process; and
   embedding the watermark in a first and a second image block from among the plurality of image blocks that form at least a part of the medical digital image.

2. The method according to claim 1, further comprising:
   generating a second chaotic parameter associated with capture information for the medical digital image; and
   generating the chaotic sequence based on both the first chaotic parameter and the second chaotic parameter.

3. The method according to claim 2, wherein generating the first chaotic parameter associated with the source information and generating the second chaotic parameter associated with the capture information comprises generating the first chaotic parameter and the second parameter based on normalizing the first single number that represents the source information and normalizing a second number that represents the capture information.

4. The method according to claim 2, wherein generating the chaotic sequence based on both the first chaotic parameter and the second chaotic parameter comprises using a Hénon map.

5. The method according to claim 1, wherein embedding the watermark in the first image block and the second image block of the transformed medical digital image comprises determining a scalar for the watermark to enable the watermark to be sufficiently imperceptible to an observer once the watermark is embedded in the transformed medical digital image.

6. The method according to claim 1, wherein embedding the watermark in the first and the second image block comprises making a difference between sums of mid-frequency DCT coefficients for the first and the second image block equal to the chaotic sequence that represents the watermark.

7. The method according to claim 1, wherein the source information includes one or more of a location of a source for the medical digital image, a person that generated the medical digital image, a date the medical digital image was generated or a doctor for a patient of the medical digital image.

8. The method according to claim 2, wherein the capture information includes patient information for the medical digital image, the patient information to include one or more of a name of a patient for the medical digital image, an address of the patient, a date of birth of the patient, a social security number for the patient, a medical identification number for the patient or a date the medical digital image was generated.

9. A method for encoding medical digital images with watermarks comprising:
generating a first chaotic parameter associated with source information for a medical digital image, wherein the first chaotic parameter is generated based at least in part on normalizing a single number representing the source information for the medical digital image;
generating a second chaotic parameter associated with capture information for the medical digital image, wherein the second chaotic parameter is generated based at least in part on normalizing a number representing the capture information for the medical digital image;
generating a chaotic sequence based on the first chaotic parameter and the second chaotic parameter, wherein the first chaotic parameter and the second chaotic parameter are used as initial conditions to generate the chaotic sequence;
transforming the medical digital image to include a plurality of image blocks;
scaling the chaotic sequence to generate a visually imperceptible scaled watermark; and
embedding the visually imperceptible scaled watermark in a first and a second image block from among the plurality of image blocks that form at least a part of the medical digital image.

10. The method according to claim 9, wherein generating the first chaotic parameter associated with the capture information and generating the second chaotic parameter associated with the capture information comprises generating the first chaotic parameter and the second parameter based on normalizing a first number that represents the source information and normalizing a second number that represents the capture information.

11. The method according to claim 9, wherein generating the chaotic sequence based on both the first chaotic parameter and the second chaotic parameter comprises using a Hénon map.

12. The method according to claim 9, wherein embedding the visually imperceptible scaled watermark in the first and the second image block comprises making a difference between sums of mid-frequency DCT coefficients for the first and the second image block equal to the chaotic sequence that represents the watermark.

13. The method according to claim 9, wherein the source information includes one or more of a location of a source for the medical digital image, a person that generated the medical digital image, a date the medical digital image was generated or a doctor for a patient of the medical digital image.

14. The method according to claim 9, wherein the capture information includes patient information for the medical digital image, the patient information to include one or more of a name of a patient for the medical digital image, an address of the patient, a date of birth of the patient, a social security number for the patient, a medical identification number for the patient or a date the medical digital image was generated.

15. A method for encoding medical digital images with watermarks comprising:
generating a first chaotic parameter associated with source information for a medical digital image, wherein the first chaotic parameter is generated based at least in part on normalizing a single number representing the source information for the medical digital image;
generating a chaotic sequence based on the first chaotic parameter, wherein the first chaotic parameter is used as an initial condition to generate the chaotic sequence and wherein the chaotic sequence represents a watermark;
transforming the medical digital image to include a plurality of image blocks via a discrete cosine transform (DCT) process;
embedding the watermark in a first and a second image block from among the plurality of image blocks that form at least a part of the medical digital image; and
transmitting the medical digital image having the embedded watermark, wherein the medical digital image comprises an entire medical digital image.

16. The method according to claim 15, further comprising:
generating a second chaotic parameter associated with capture information for the medical digital image; and
generating the chaotic sequence based on both the first chaotic parameter and the second chaotic parameter.

17. The method according to claim 16, wherein generating the first chaotic parameter associated with the source information and generating the second chaotic parameter associated with the capture information comprises generating the first chaotic parameter and the second chaotic parameter based on normalizing a first number that represents the source information and normalizing a second number that represents the capture information.

18. The method according to claim 16, wherein generating the chaotic sequence based on both the first chaotic parameter and the second chaotic parameter comprises using a Hénon map.

19. The method according to claim 16, wherein the capture information includes patient information for the medical digital image, the patient information to include one or more of a name of a patient for the medical digital image, an address of the patient, a date of birth of the patient, a social security number for the patient, a medical identification number for the patient or a date the medical digital image was generated, and wherein the source information includes one or more of a location of a source for the medical digital image, a person that generated the medical digital image, a date the medical digital image was generated or a doctor for a patient of the medical digital image.

20. The method according to claim 15, wherein embedding the watermark in the first image block and the second image block of the transformed medical digital image comprises determining a scalar for the watermark to enable the watermark to be sufficiently imperceptible to an observer once the watermark is embedded in the transformed medical digital image.

21. The method according to claim 15, wherein embedding the watermark in the first and the second image block comprises making a difference between sums of mid-frequency DCT coefficients for the first and the second image block equal to the chaotic sequence that represents the watermark.

* * * * *